W. A. WENTZELL.
BEER DISPENSING APPARATUS.
APPLICATION FILED MAR. 9, 1909.
946,477.
Patented Jan. 11, 1910.
3 SHEETS—SHEET 1.
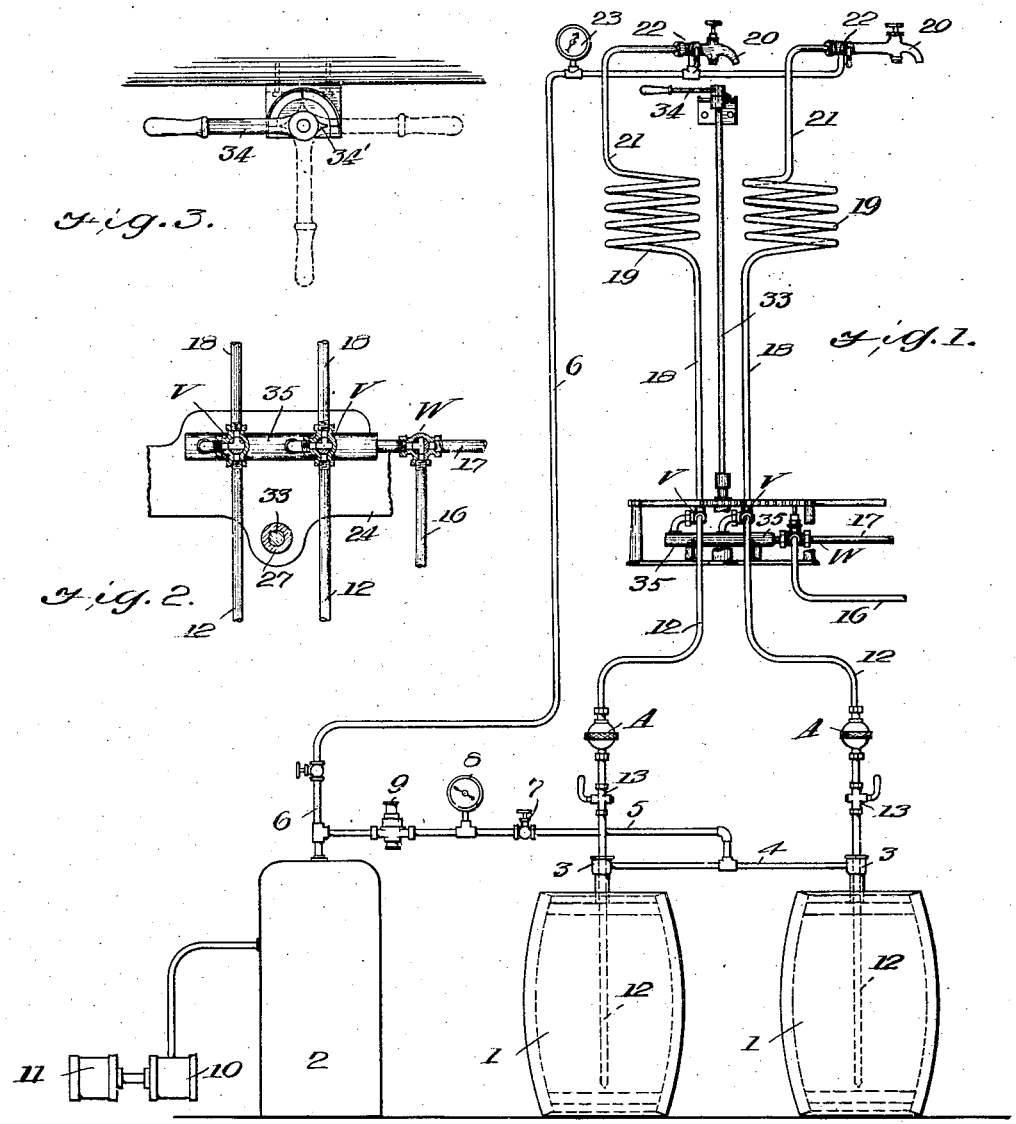
WITNESSES:
F. C. Barry
L. A. Stanley
INVENTOR
WILLIAM A. WENTZELL
BY Munn & Co.
ATTORNEYS.

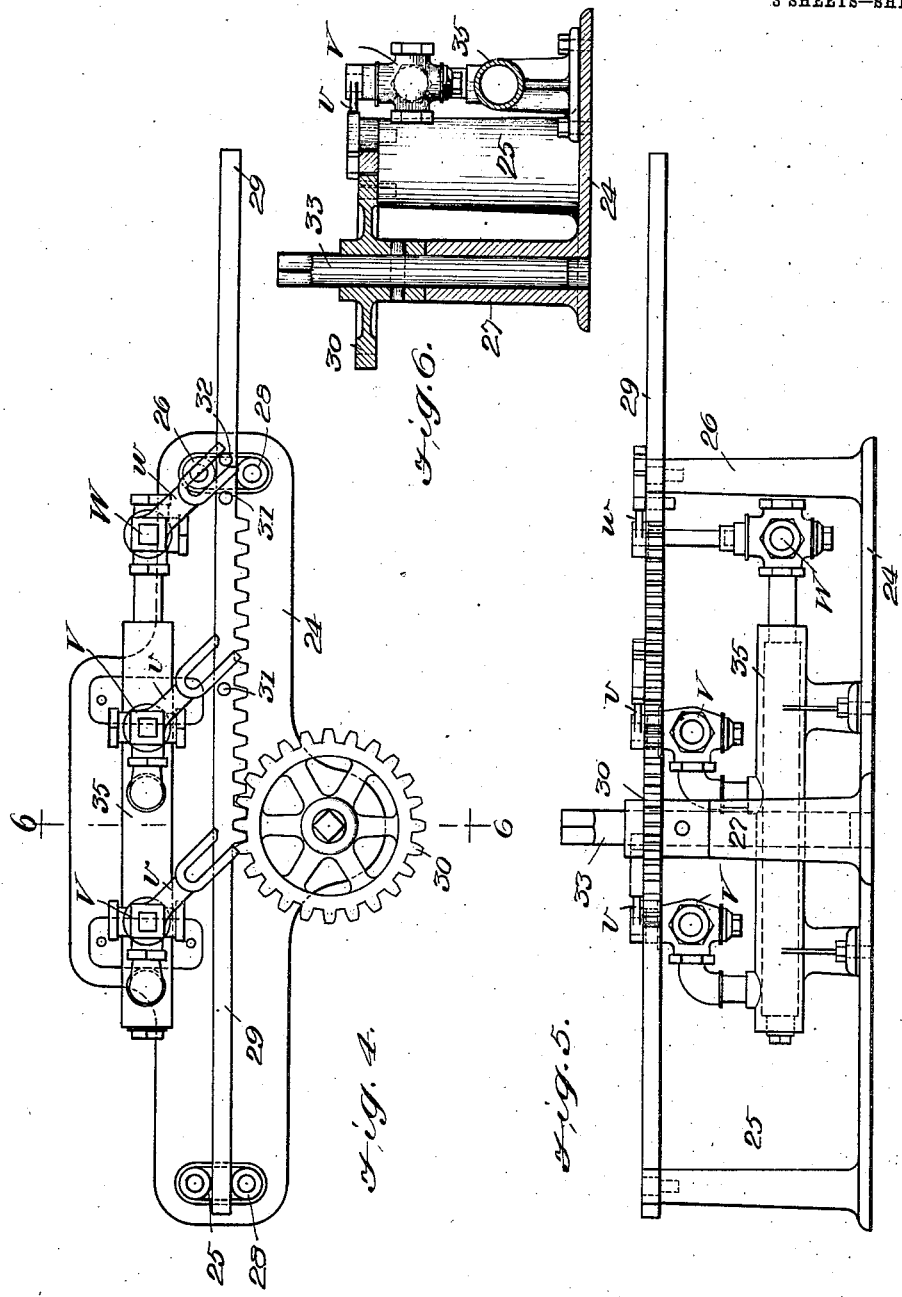

W. A. WENTZELL.
BEER DISPENSING APPARATUS.
APPLICATION FILED MAR. 9, 1909.
946,477.
Patented Jan. 11, 1910.
3 SHEETS—SHEET 3.
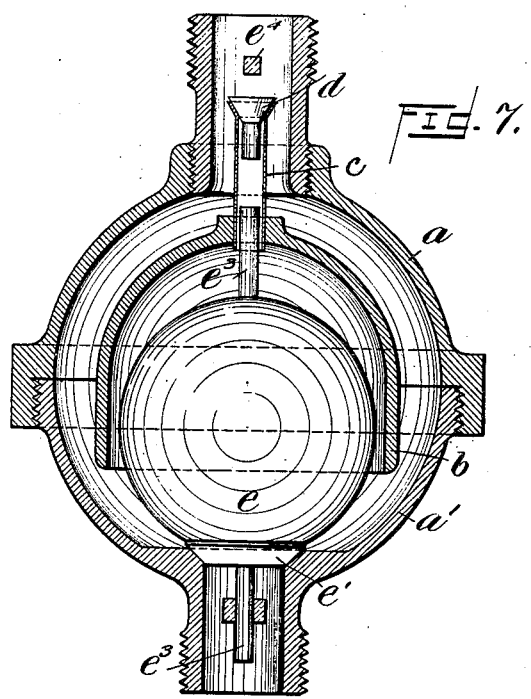
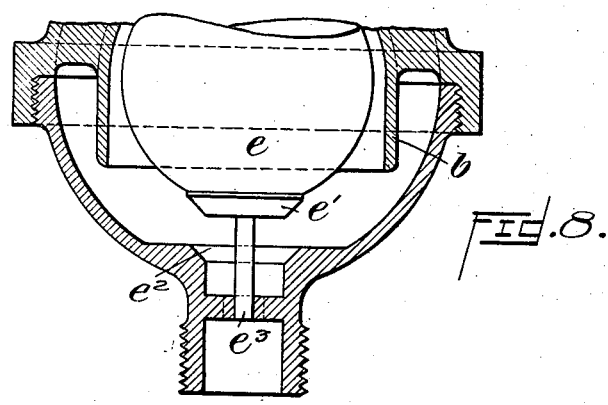
WITNESSES:
INVENTOR
WILLIAM A. WENTZELL
ATTORNEYS.

UNITED STATES PATENT OFFICE.

WILLIAM ALBERT WENTZELL, OF NEW ALBANY, INDIANA.

BEER-DISPENSING APPARATUS.

946,477.

Specification of Letters Patent. Patented Jan. 11, 1910.

Application filed March 9, 1909. Serial No. 482,395.

*To all whom it may concern:*

Be it known that I, WILLIAM ALBERT WENTZELL, a citizen of the United States, and a resident of New Albany, in the county of Floyd and State of Indiana, have made certain new and useful Improvements in Beer-Dispensing Apparatus, of which the following is a specification.

My invention relates to devices for saving beer and for cleaning the coils and faucets used in the dispensing of beer or other liquid, and it consists in the constructions, combinations and arrangements hereinafter described and claimed.

An object of my invention is to provide a device by which the manipulation of simple mechanism may cause the return of beer to the kegs, the cleaning of the coils, pipes and faucets and the draining of these parts, thereby leaving the apparatus clean and ready for subsequent use.

A further object of my invention is to so arrange a system of water supply and air (or gas pressure) that the operation stated may be effected by directing the water or air into the appropriate channels through the medium of the aforesaid mechanism.

A further object of my invention is to effect a saving of the beer which would ordinarily be left standing in the coils when the latter are not being used, as at the end of each day's business, and which, owing to the impregnation of metallic or other poisons renders the beer unfit for use so that it has to be thrown away when drawn. I accomplish this saving by returning the beer to the kegs, as before stated, at the end of each day's business and then cleaning the coils in the manner hereinafter described.

Other objects and advantages will appear in the following specification and will be particularly pointed out in the appended claims.

My invention is illustrated in the accompanying drawings, forming a part of this specification, in which similar reference characters indicate like parts in the several views; and in which—

Figure 1 is a view showing the general arrangement of the various parts of the device. Fig. 2 is a detail view partly in section showing the connections of the three-way cocks. Fig. 3 is a detail plan view of the operating lever and indicator. Fig. 4 is a detail plan view of the means for simultaneously operating the cocks of Fig. 2. Fig. 5 is a side view of the mechanism shown in Fig. 4. Fig. 6 is a sectional view thereof on the line 6—6 of Fig. 4. Fig. 7 is an enlarged vertical section of the air trap, showing valve closed, and Fig. 8 is a fragmentary section at right angles to Fig. 7 showing the valve open.

In carrying out my invention I provide the apparatus illustrated in Fig. 1. The beer is contained in the kegs 1 of which there may be any number, although I have shown two in the drawing. These are normally connected with a tank 2 holding compressed air or carbonic acid gas, by means of the pipes 3, 4, 5 and 6. The pipe 5 is provided with an outlet cock 7, a pressure indicator 8 and a pressure regulator 9. If compressed air is used it may be obtained by means of the air compressor 10 which is driven by a motor or engine 11.

The pipes 13 extend down into the kegs 1 and are connected with the three-way cocks V as hereinafter explained. In circuit with the pipes 12 are the air traps A and the outlet cocks 13. The cocks V are connected with a header 35, the latter being also in communication with a three-way cock W which is connected with a water supply by means of the pipe 16 and is provided with a drain pipe 17. Communicating with the cocks V are the pipes 18 leading to the coils 19. The faucets 20 are connected with the coils by the pipes 21. In circuit with the latter are the three-way cocks 22, which have one port connected with the reservoir 2 by means of the pipe 6, which is provided with a pressure gage 23.

The mechanism for operating the cocks V and W is best shown in Figs. 4, 5 and 6. It consists of a base 24, provided with uprights 25, 26 and 27. Slidably mounted between the friction rollers 28 on the uprights 25 and 26 is a rack 29 arranged to be actuated by a gear 30 on the upright 27 and to cause the shifting of the cocks V and W through the engagement of the yokes of the cock levers *v* and *w* by the pins 31 and 32 respectively, on the rack. The upright 27 forms a support for the gear 30 and a bearing for the rod 33 leading to the operating lever 34. The latter is provided with an indicating pointer 34' and may be shifted in the manner indicated in Fig. 3. Each of the cocks V and W is connected with a header 35 which is mounted upon the base 24.

The air trap A is shown in detail in Figs.

7 and 8. This trap can be made in various ways and out of various materials, such as metal and rubber or a combination of both. It comprises two hemispherical parts $a$ and $a'$ joined together. The upper part $a$ is provided with a depending hood $b$ having a tube $c$ in its top, normally closed by a valve $d$. A float $e$ made of any suitable material but preferably made of rubber, constitutes the main valve and has a bottom member $e'$ adapted to seat in an opening $e^2$. The float is provided with upper and lower guide stems $e^3$. A stop $e^4$ limits the movement of the valve $d$.

From the foregoing description of the various parts the operation thereof may be readily understood. The pressure in the tank 2 should preferably be above that in the kegs. Thus if the reservoir pressure is twenty-five pounds the pressure regulator 9 admits say ten pounds to the kegs. The three-way cocks 22 are turned to shut off the air and to establish communication with the faucets 20. Let us assume that the lever 34 is in the position shown in full lines in Fig. 3. The cock mechanism is then in the position shown in Figs. 2, 4 and 5. From Fig. 2 it will be seen that the water supply pipe 16 will be in communication with the header 35 and that the latter is now connected to the pipes 18 leading to the coils 19. Now by merely opening the faucets, the latter, together with their respective coils and the pipes leading thereto will be thoroughly cleaned. The lever 34 is now turned to its central position turning the gear 30 and the moving rack 29 to the left. The pin 32 engages the cock lever $w$ closing off the water and opens the drain pipe 17, thereby allowing the water to run out of the coils. When the lever 34 is shifted to its third position (shown in dotted lines) the cocks V are turned by means of the engagement of the pins 31, closing against the drain and opening to the beer. Communication is now established between the kegs and the coils so that the beer may be now drawn from the faucets, the valve $e$ of the air trap A opening to permit the upward flow. To return the beer to the kegs preparatory to cleaning the pipes, the cock 22 is turned to admit air from the pipe 6. The incoming air forces the beer downwardly out of the coils. As long as there is enough liquid in the lower part of the air trap A to keep the float valve $e$ up, the beer has a free passage therethrough. As soon, however, as the air reaches the float, the latter drops, shutting the opening $e^2$, and preventing air from entering the kegs. The valve $d$ permits the escape of air from under the hood $b$ when the beer is forced upwardly again, while the hood itself protects the float when the beer is descending. When the cock 22 is first turned to admit air from the pipe 6, the air expands into the coils and the operator, observing a decrease in the pressure reading of the indicator, knows that the beer has been all forced back into the kegs when the pointer on the indicator dial becomes stationary.

It will be noted that when the cock 22 is turned to admit air from the pipe 6, the twenty-five pounds pressure in the latter pipe causes the beer to be forced back into the receptacle, in which the pressure is only ten pounds. The beer, however, is forced back into the receptacle before the pressures are balanced.

I am aware that other forms of the device based upon the same general principle might be made, but I consider as my own all such modifications as fairly fall within the spirit and scope of the invention.

I claim—

1. In a beer dispensing apparatus, a beer receptacle, a coil, a faucet connected therewith, a header, a water-supply pipe and a drain-pipe connected to said header, and a plurality of three-way cocks carried by said header and arranged to connect said coil with either the beer receptacle, the water-supply pipe, or the drain-pipe.

2. In a beer dispensing apparatus, a beer receptacle, a coil, a faucet connected therewith, a header, a pipe connecting said header with said coil, a pipe connecting said receptacle with said header, a drain-pipe connected with said header, and a water-supply pipe connected with said header, a plurality of three-way cocks, a common operating lever and means moved by said lever for simultaneously actuating said cocks.

3. In a beer dispensing apparatus, a beer receptacle, a coil and faucet connected therewith, a tank adapted to hold a compressed gas, in communication with said receptacle for forcing the beer through said coil, a pipe extending from said tank and communicating with the coil at one end for forcing the beer back into said receptacle, means for preventing the entrance of gas from the coil into the beer receptacle, and means for indicating when the beer is all forced back into the receptacle.

4. In a beer dispensing apparatus, a beer receptacle, a coil and faucet connected therewith, a water supply pipe and a drain pipe adapted to be connected with said coil, a plurality of three-way cocks and a common operating lever for said cocks, the said apparatus constituting means for cleaning the coils, draining them and subsequently filling them with beer.

5. In a beer dispensing apparatus, a beer receptacle, a coil and faucet connected therewith, a pressure tank for forcing the beer through said coil, a pipe extending from said tank and communicating directly with said coil, a three-way cock for admitting gas into said coil for forcing the beer back into the receptacle, a float valve for preventing gas from said coil from entering said receptacle, a drain pipe and a water supply pipe adapted to communicate with said coil, a plurality of three-way cocks for establishing communication betwen said coil and said receptacle, said water supply and said drain pipe respectively, an operating lever, a pinion secured thereto and a sliding rack member adapted to engage the levers of the three-way cocks for operating the same.

WILLIAM ALBERT WENTZELL.

Witnesses:
MILTON E. LORD,
EDW. A. WENTZELL.